United States Patent [19]
Tseng

[11] Patent Number: 6,024,472
[45] Date of Patent: Feb. 15, 2000

[54] AUTOMOBILE WITH ANGLE-ADJUSTABLE FRONT LAMP DEVICE FOR PROVIDING AN ANGLE OF IRRADIATION THAT VARIES IN ACCORDANCE WITH ROTATION OF A STEERING WHEEL

[76] Inventor: Chian-Yin Tseng, No. 60, Lane 105, Wen-Nan Rd., Tainan, Taiwan

[21] Appl. No.: 08/928,290

[22] Filed: Sep. 12, 1997

[30] Foreign Application Priority Data

Aug. 6, 1997 [TW] Taiwan ................................. 86111236

[51] Int. Cl.[7] .................................................. B60Q 1/12
[52] U.S. Cl. ................................ 362/467; 362/37; 362/50
[58] Field of Search .................................. 362/37, 49, 50, 362/464, 465, 467

[56] References Cited

U.S. PATENT DOCUMENTS

| 1,069,615 | 8/1913 | Hughes ......................................... 362/50 |
| 4,340,928 | 7/1982 | Hohmann, Jr. ............................. 362/49 |
| 4,908,560 | 3/1990 | Shibata et al. ............................ 362/465 |
| 5,099,400 | 3/1992 | Lee ............................................. 362/37 |
| 5,868,488 | 2/1999 | Speak et al. ............................... 362/37 |

FOREIGN PATENT DOCUMENTS

| 174548 | 4/1953 | Austria ........................................ 362/50 |
| 0 507 273 A1 | 7/1992 | European Pat. Off. . |
| 186546 | 11/1982 | Japan ........................................... 362/37 |
| 360082459 | 5/1985 | Japan ......................................... 362/466 |
| 406087371 | 3/1994 | Japan ........................................... 362/37 |
| 2 208 919 | 4/1989 | United Kingdom . |

Primary Examiner—Alan Cariaso
Attorney, Agent, or Firm—Hoffman & Baron, LLP

[57] ABSTRACT

An automobile includes an automobile body, a wheel drive assembly mounted to the automobile body, a front lamp device mounted turnably on the automobile body, a motor drive device coupled to the front lamp device and operable so as to turn the front lamp device relative to the automobile body, and a control device coupled electrically to the motor drive device and coupled mechanically to the wheel drive assembly for detecting angular rotation of a steering wheel of the wheel drive assembly and for operating the motor drive device so as to turn the front lamp device by an angle corresponding to the angular rotation of the steering wheel.

6 Claims, 7 Drawing Sheets

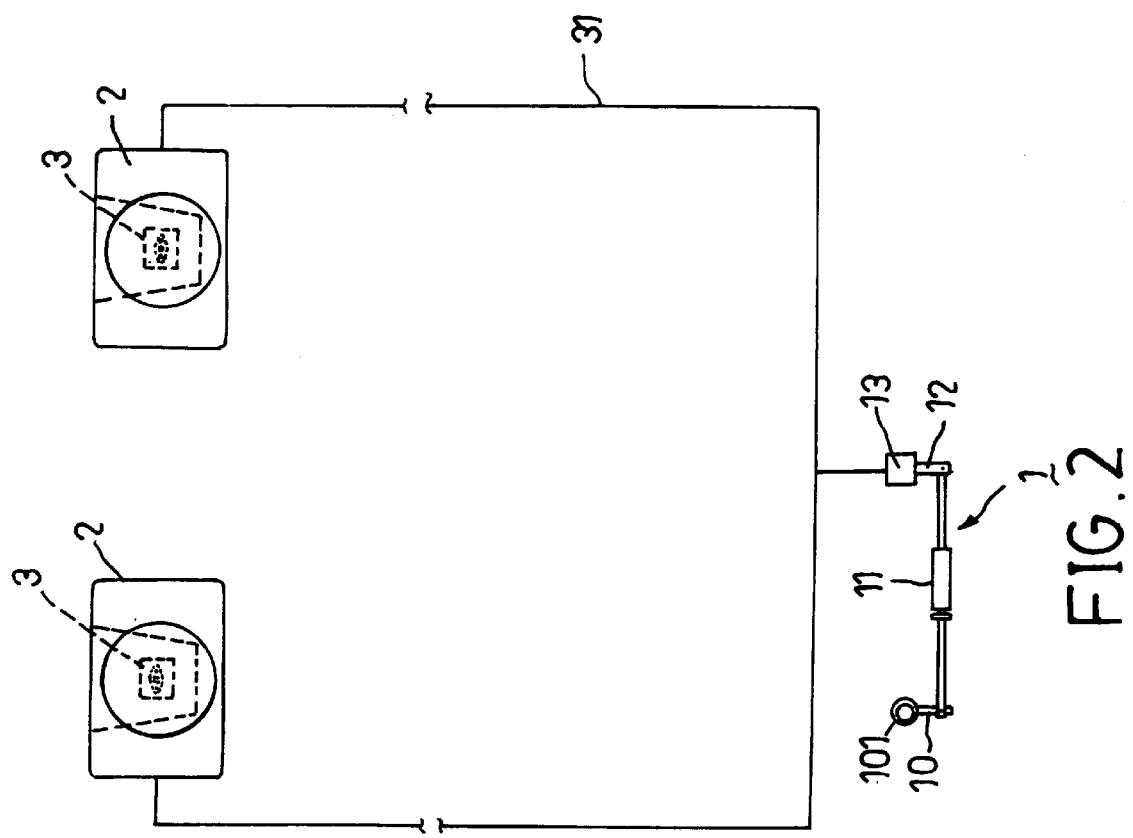

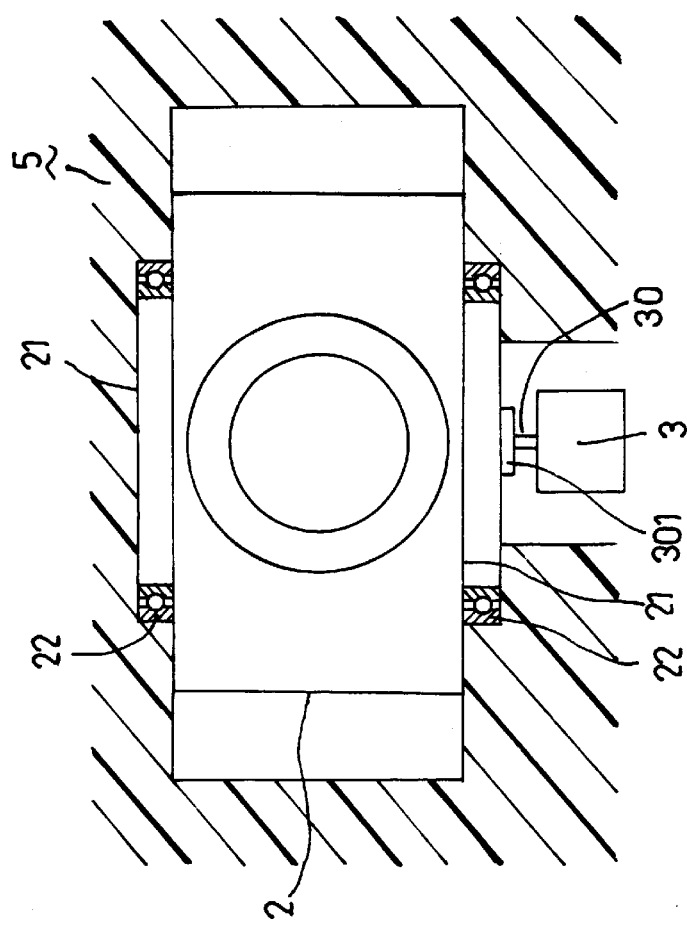
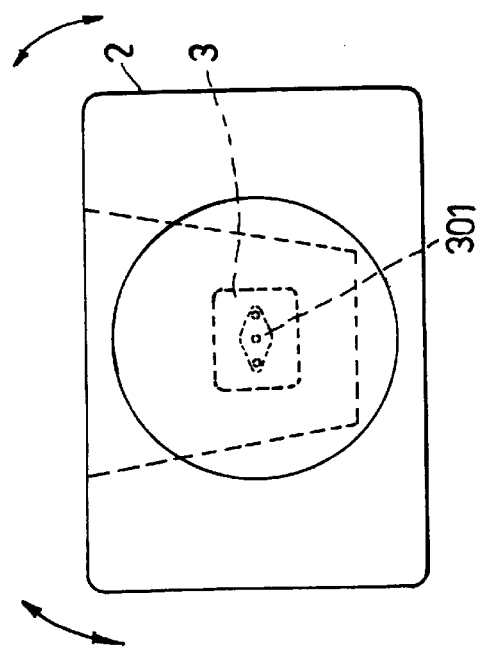
FIG.4
FIG.3

AUTOMOBILE WITH ANGLE-ADJUSTABLE FRONT LAMP DEVICE FOR PROVIDING AN ANGLE OF IRRADIATION THAT VARIES IN ACCORDANCE WITH ROTATION OF A STEERING WHEEL

BACKGROUND OF THE INVENTION

1. Field of the Invention

The invention relates to a front lamp device of an automobile, more particularly to an automobile with an angle-adjustable front lamp device for providing an angle of irradiation that varies with respect to the automobile body and in accordance with the rotation of a steering wheel.

2. Description of the Related Art

Currently, the front lamp device, such as a head lamp or a fog lamp, of an automobile is mounted fixedly on the automobile body. Since the range of irradiation of the front lamp device is limited, the direction of irradiation is thus limited only to the same direction as the front side of the automobile body. Therefore, under poor ambient light conditions, regardless of whether the head lamp or the fog lamp is activated, the driver of the automobile is unable to see clearly a person, another automobile or an object on the left front side or right front side of the automobile. Referring to FIG. 1, although this situation is not likely to create any difficulty when driving along a straight road, when the automobile turns at a corner, the driver should observe the left or right side road conditions to see if there is any person, automobile or obstruction before making the turn. Unfortunately, since the irradiation of the front lamp device is directed forwardly, it is possible that the driver of the automobile will be unable to see an obstruction (A) on time when turning.

When making a turn, the steering wheel of a wheel drive assembly is operated so as to turn the front wheels of the automobile by a desired angle, thereby enabling the automobile body to turn accordingly. However, as shown in FIG. 1, turning of the automobile body occurs later than the turning of the front wheels or the steering wheel of the automobile. Thus, even though the driver of the automobile has half-completed a turning operation for the steering wheel, it is possible that the automobile body will only begin to turn at that time. Therefore, the front lamp device will be unable to irradiate the obstruction (A) in order to enable the driver to see the same before turning of the steering wheel is completed, thereby increasing the possibility of an accident.

In addition, accidents can easily occur when driving at night along a mountain side because of poor ambient light and the presence of winding road sections. When driving along a winding road, the front lamp device is usually directed to a forest side or mountain side of the road and is unable to irradiate the forward side of the road, thereby making it difficult for the driver of the automobile to avoid accidents.

SUMMARY OF THE INVENTION

Therefore, the object of the present invention is to provide an automobile with an angle-adjustable front lamp device, whereby the angle of irradiation of the front lamp device can vary with respect to the automobile body and in accordance with the rotation of a steering wheel in order to provide adequate warning to the driver of the automobile concerning the road conditions when making a turn so as to reduce the possibility of an accident and enhance safety when driving.

Accordingly, the automobile of the present invention includes an automobile body, a wheel drive assembly mounted to the automobile body, a front lamp device mounted turnably on the automobile body, a motor drive device coupled to the front lamp device and operable so as to turn the front lamp device relative to the automobile body; and a control device coupled electrically to the motor drive device and coupled mechanically to the wheel drive assembly for detecting angular rotation of a steering wheel of the wheel drive assembly and for operating the motor drive device so as to turn the front lamp device by an angle corresponding to the angular rotation of the steering wheel.

BRIEF DESCRIPTION OF THE DRAWINGS

Other features and advantages of the present invention will become apparent in the following detailed description of the preferred embodiments with reference to the accompanying drawings, of which:

FIG. 2 is a schematic view illustrating a front lamp device, a motor drive device and a control device of the first preferred embodiment of an automobile according to the present invention;

FIG. 3 is a schematic view illustrating a lamp unit of the front lamp device of the first preferred embodiment;

FIG. 4 is a schematic, partly sectional view illustrating how the lamp unit of the front lamp device is turned relative to an automobile body;

DESCRIPTION OF THE PREFERRED EMBODIMENTS

Figure 1:
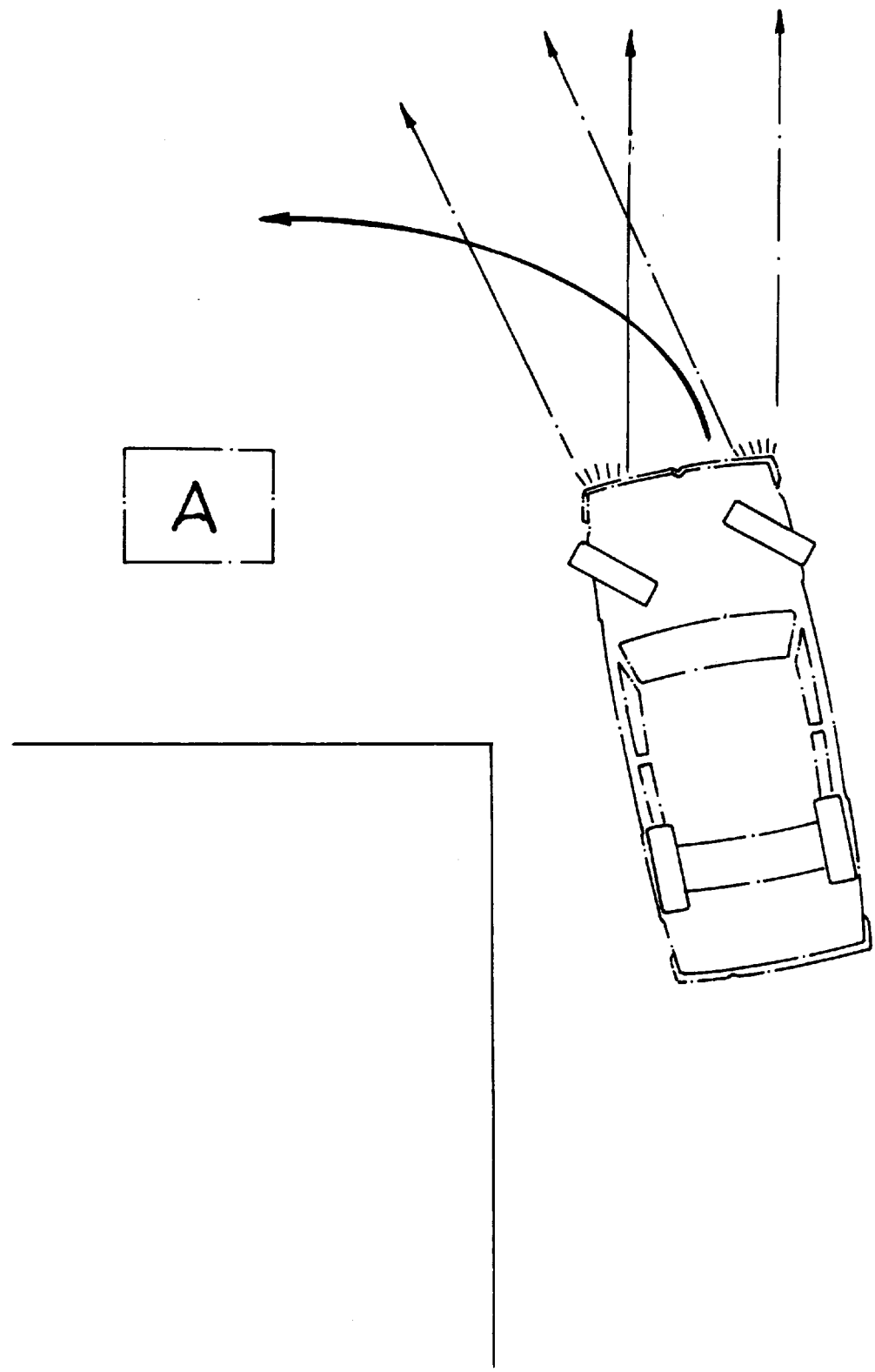
FIG. 1 illustrates how an accident can occur when a conventional automobile makes a turn.

The first preferred embodiment of an automobile according to the present invention is shown to comprise an automobile body 5 (see FIG. 4); a wheel drive assembly 9 (see FIG. 7) mounted to the automobile body 5 in a conventional manner; a front lamp device which includes a set of lamp units 2 (see FIGS. 2, 3 and 4), such as head lamps or fog lamps, and which is mounted turnably on a front end of the automobile body 5; a motor drive device (see FIGS. 2, 3 and 4) which includes a set of servo motor units 3 and which is coupled to the front lamp device for turning the lamp units 2 about vertical axes relative to the automobile body 5; and a control device 1 (see FIGS. 2, 5 and 6) coupled electrically to the motor drive device and coupled mechanically to the wheel drive assembly 9 for detecting angular rotation of a steering wheel 90 and a steering wheel shaft 91 of the wheel drive assembly 9 and for operating the motor drive device so as to turn the front lamp device by an angle corresponding to the angular rotation of the steering wheel 90 and the steering wheel shaft 91.

Figure 7:
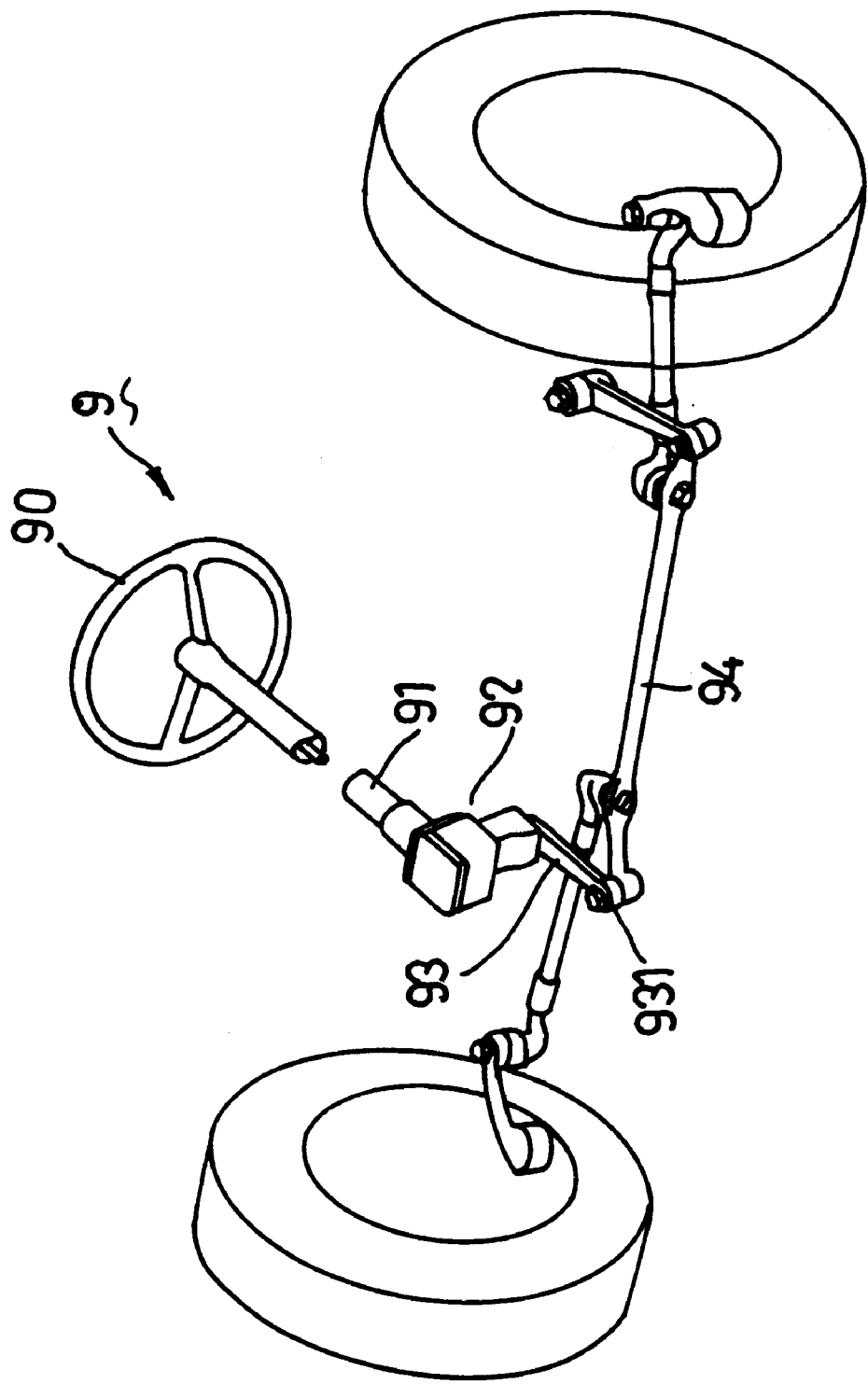
FIG. 7 is a perspective view illustrating the wheel drive assembly of the first preferred embodiment.

As shown in FIG. 7, the wheel drive assembly 9 is conventional in construction and includes the steering wheel 90 mounted on the upper end of the steering wheel shaft 91, a steering gear unit 92 coupled to a lower end of the steering wheel shaft 91, and a steering linkage 93 having an arm 931 connected to an output shaft 920 (see FIG. 5) of the steering gear unit 92 and a tie rod unit 94 which interconnects the arm 931 and the front wheels of the automobile.

Referring to FIGS. 3 and 4, in the preferred embodiment, the lamp units 2 of the front lamp device have circular top and bottom ends 21 which are provided with a respective bearing 22 for mounting turnably the front lamp device on the automobile body 5. The servo motor units 3 of the motor drive device have drive shafts 30 coupled to fixing plates 301 which are mounted securely on the bottom ends 21 of the lamp units 2.

Figure 6:
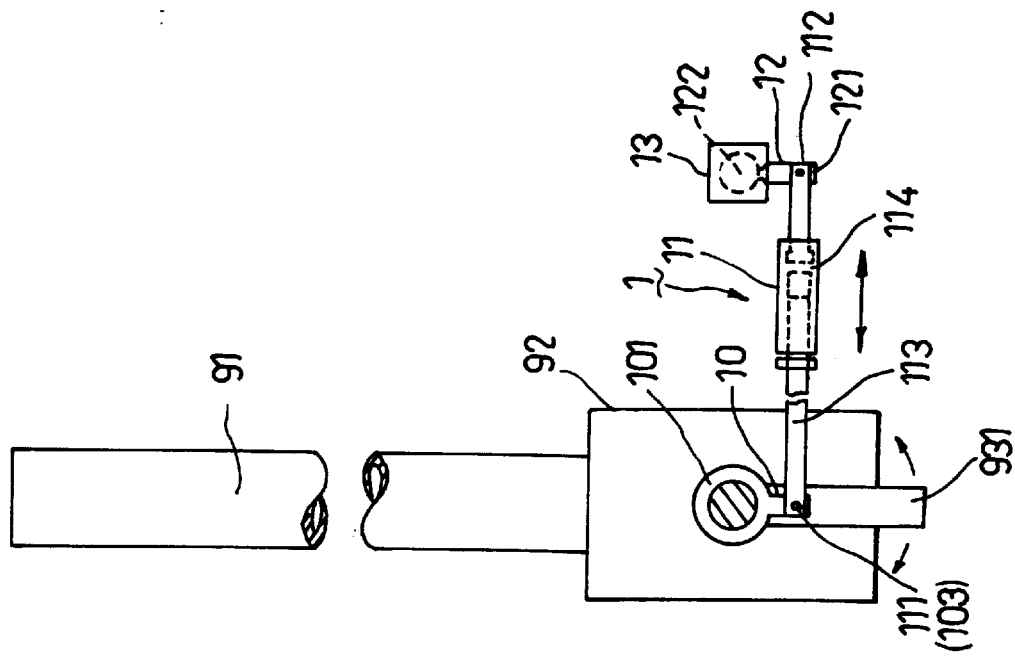
FIG. 6 is a schematic front view illustrating the wheel drive assembly and the control device of the first preferred embodiment.
Figure 5:
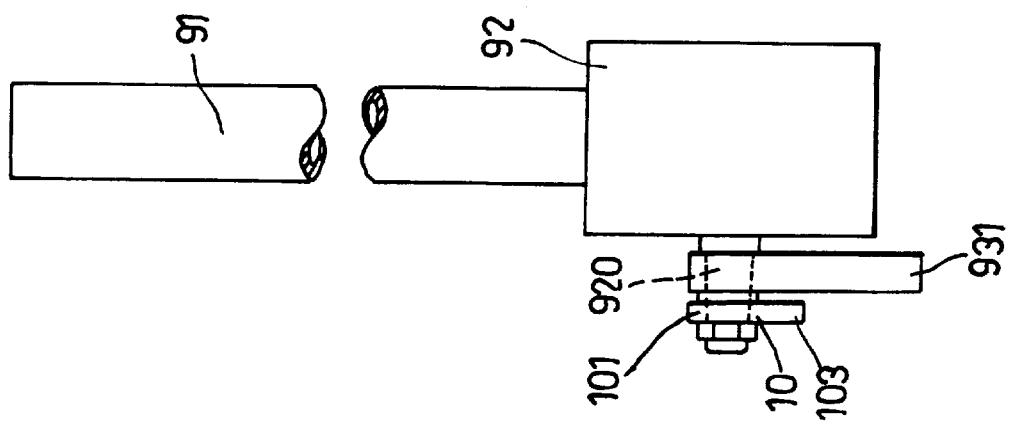
FIG. 5 is a schematic side view illustrating a wheel drive assembly and the control device of the first preferred embodiment.

Referring to FIGS. 2, 5 and 6, the control device 1 includes an angle control unit 13 and a coupling unit constituted by a pivoting member 10, a link member 11 and a pivoted member 12, for coupling the wheel drive assembly 9 and the angle control unit 13 in order to transmit the rotation of the steering wheel 90 to the angle control unit 13. The pivoting member 10 has a first end 101 mounted securely on the output shaft 920 of the steering gear unit 92, and a second end 103. The link member 11 has a first end 111 pivoted to the second end 103 of the pivoting member 10, and a second end 112. In this embodiment, the link member 11 is a variable-length link which includes an externally threaded shank section 113 and an internally threaded socket section 114, as shown in FIG. 6. The pivoted member 12 has a first end 121 connected pivotally to the second end 112 of the link member 11, and a second end 122 coupled to the angle control unit 13. Therefore, rotation of the output shaft 920 of the steering gear unit 92 is transmitted to the angle control unit 13 via the coupling unit. Preferably, the distance between the points of connection at the first and second ends 101, 103 of the pivoting member 10 is equal to the distance between the points of connection at the first and second ends 121, 122 of the pivoting member 12 in order to ensure that the pivoting and pivoted members 10, 12 rotate by the same angle.

The angle control unit 13 is connected electrically to the motor drive device via electrical wires 31, as shown in FIG. 2. Alternatively, the angle control unit 13 may be coupled electrically to the motor drive device via wireless remote control means. The angle control unit 13 detects the angular rotation of the pivoted member 12 and generates an electrical control signal corresponding thereto to control angular rotation of the drive shafts 30 of the servo motor units 3 in a known manner, thereby turning the front lamp device relative to the automobile body 5 by an angle corresponding to the angular rotation of the steering wheel 90.

In use, when the steering wheel 90 of the wheel drive assembly 9 of the automobile of the present invention is operated so as to turn the automobile, the steering wheel shaft 91 and the output shaft 920 of the steering gear unit 92 rotate accordingly to enable the steering linkage 93 to turn the front wheels of the automobile. At the same time, the pivoting member 10 pivots due to the rotation of the output shaft 920, thereby pulling the link member 11 to result in corresponding pivoting movement of the pivoted member 12. The angle control unit 13 detects the angular rotation of the pivoted member 12 and generates a corresponding electrical control signal for controlling the drive shafts 30 of the servo motor units 3 of the motor drive device to rotate, thereby turning the lamp units 2 of the front lamp device relative to the automobile body 5. Preferably, the angular rotation of the lamp units 2 approximates that of the front wheels of the automobile. However, the actual angular rotation of the lamp units 2 can be controlled through the angle control unit 13.

In the preferred embodiment, the coupling arrangement between the drive shafts 30 of the servo motor units 3 and the lamp units 2 of the front lamp device can be modified into a speed reducing gear mechanism so that the angular movement of the front lamp device relative to the automobile body 5 can be made larger or smaller as compared to the steering wheel 90 of the wheel drive assembly 9. Moreover, by adjusting the length of the link member 11, the sensitivity of the coupling unit can be adjusted. In addition, the link member 11 of the coupling unit can be connected directly to the arm 931 of the steering linkage 93, thereby doing away with the pivoting member 10.

Figure 8:
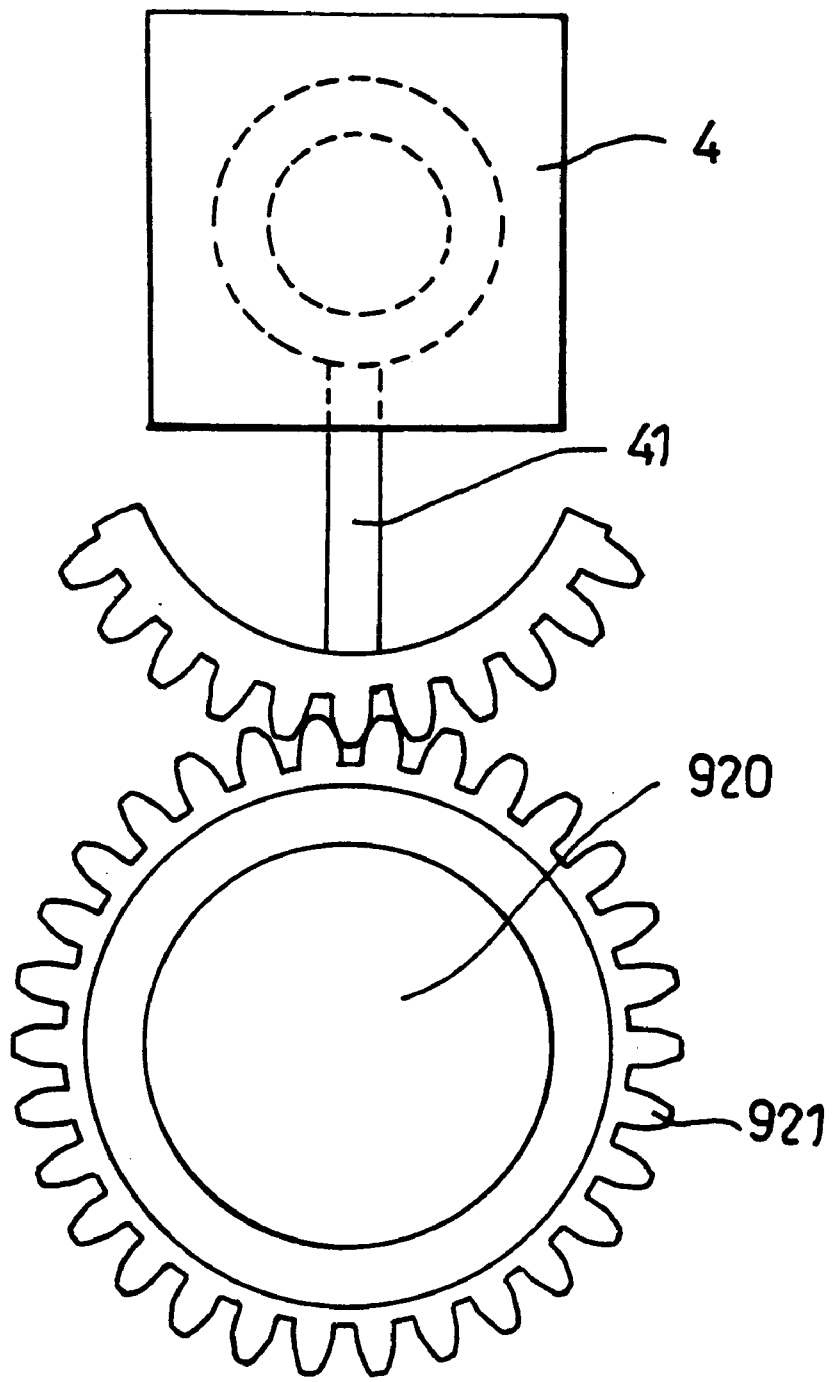
FIG. 8 is a schematic front view illustrating a control device of the second preferred embodiment of an automobile according to the present invention.
Figure 9:
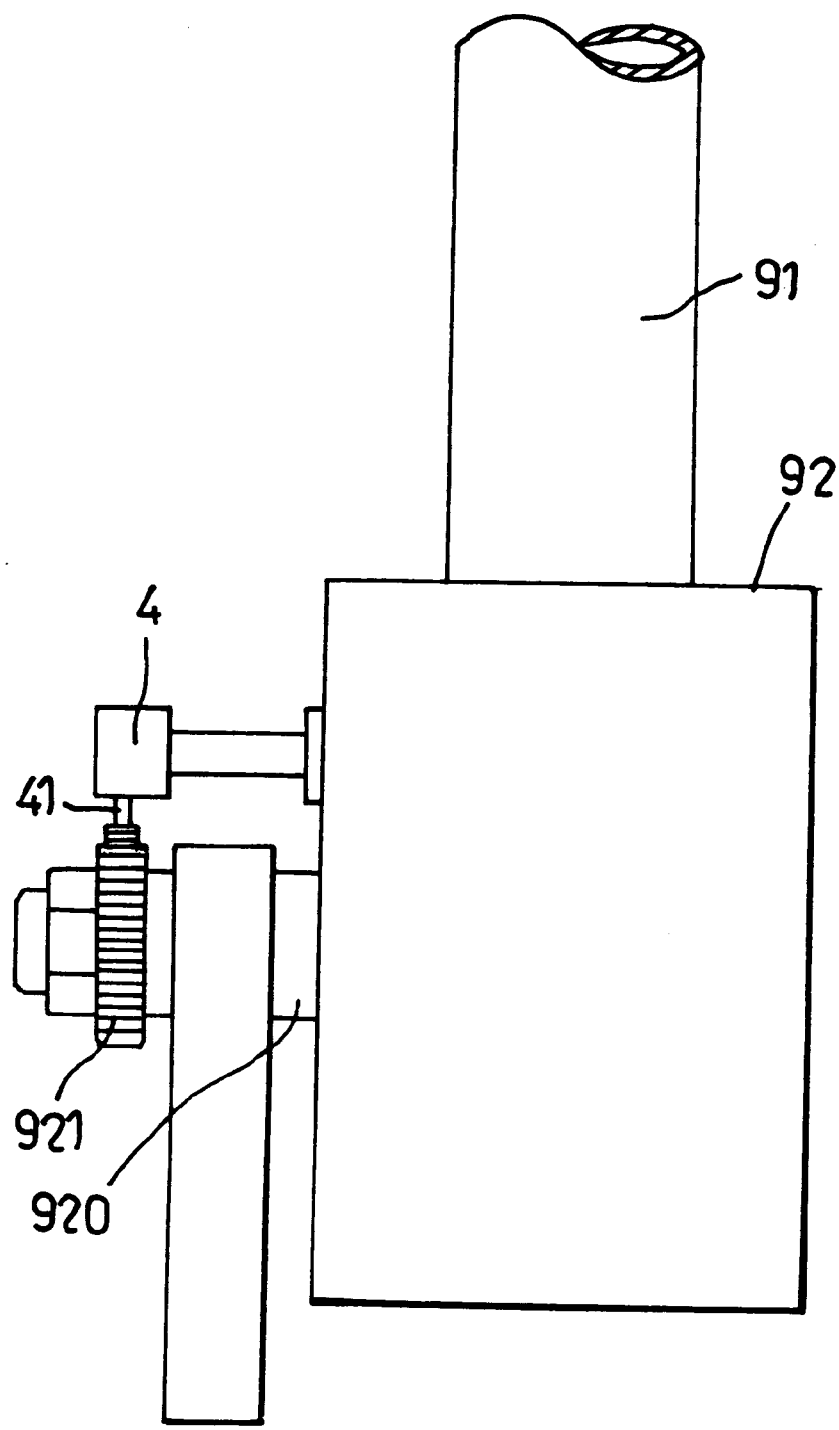
FIG. 9 is a schematic side view illustrating the control device of the second preferred embodiment.

FIGS. 8 and 9 illustrate a control device of the second preferred embodiment of an automobile according to the present invention. As shown, unlike the first preferred embodiment, the angle control unit 4 is coupled to the wheel drive assembly by a coupling unit 41 which meshes with a gear 921 on the output shaft 920 of the steering gear unit 92, thereby enabling the angle control unit 4 to detect the angular rotation of the steering wheel (not shown). Alternatively, the angle control unit 4 can be coupled to the steering wheel shaft 91 to achieve the same result. The operation of the second preferred embodiment is the same as that of the previous embodiment and will not be described hereinafter.

It has thus been shown that the automobile of the present invention provides a front lamp device with an angle of irradiation that varies with respect to the automobile body and in accordance with the rotation of a steering wheel in order to provide adequate warning to the driver of the automobile concerning the road conditions when making a turn so as to reduce the possibility of an accident and enhance safety when driving. The object of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An automobile including an automobile body, a wheel drive assembly and a lamp assembly mounted to said automobile body, said wheel drive assembly including a steering wheel, said lamp assembly including a front lamp device mounted turnably on said automobile body, a motor drive device coupled to said front lamp device and operable so as to turn said front lamp device relative to said automobile body, and a control device coupled electrically to said motor drive device and coupled mechanically to said wheel drive assembly for detecting angular rotation of said steering wheel and for operating said motor drive device so as to turn said front lamp device by an angle corresponding to the angular rotation of said steering wheel wherein said control device comprises:

an angle control unit for detecting the angular rotation of said steering wheel, said angle control unit generating a corresponding electrical control signal for controlling said motor drive device to turn said front lamp device relative to said automobile body; and a couple unit which couples said wheel drive assembly and said angle control unit so as to transmit the rotation of said steering wheel to said angle control unit, said coupling unit including a link member having a first end pivoted to said wheel drive assembly, and a second end, and a pivoted member having a first end connected pivotally to said second end of said link member, and a second end coupled to said angle control unit.

2. The automobile of claim 1, wherein said motor drive device comprises a servo motor unit having a drive shaft coupled to said front lamp device.

3. The automobile of claim 1, wherein said wheel drive assembly further includes:

a steering wheel shaft having an upper end with said steering wheel mounted thereon, and a lower end;

a steering gear unit coupled to said lower end of said steering wheel shaft and provided with an output shaft; and a steering linkage connected to said output shaft of said steering gear unit.

4. An automobile including an automobile body, a wheel drive assembly and a lamp assembly mounted to said automobile body, said wheel drive assembly including a steering wheel, a steering wheel shaft having an upper end with said steering wheel mounted thereon, and a lower end, a steering gear unit coupled to said lower end of said steering wheel shaft and provided with an output shaft, and a linkage connected to said output shaft of said steering gear unit, said lamp assembly including a front lamp device mounted turnably on said automobile body, a motor drive device coupled to said front lamp device and operable so as to turn said front lamp device relative to said automobile body, and a control device coupled electrically to said motor drive device and coupled mechanically to said wheel drive assembly for detecting angular rotation of said steering wheel and for operating said motor drive device so as to turn said front lamp device by an angle corresponding to the angular rotation of said steering wheel, wherein said control device comprises:

an angle control unit for detecting the angular rotation of said steering wheel, said angle control unit generating a corresponding electrical control signal for controlling said motor drive device to turn said front lamp device relative to said automobile body; and a coupling unit which couples said wheel drive assembly and said angle control unit so as to transmit the rotation of said steering wheel to said angle control unit, said coupling unit including a pivoting member having a first end mounted securely on said output shaft of said steering gear unit, and a second end, a link member having a first end pivoted to said second end of said pivoting member, and a second end, and a pivoted member having a first end connected pivotally to said second end of said link member, and a second end coupled to said angle control unit;

whereby, rotation of said output shaft of said steering gear unit is transmitted to said angle control unit via said coupling unit.

5. The automobile of claim 4, wherein said link member is a variable-length link.

6. An automobile including an automobile body, a wheel drive assembly and a lamp assembly mounted to said automobile body, said wheel drive assembly including a steering wheel, a steering wheel shaft having an upper end with said steering wheel mounted thereon, and a lower end, a steering gear unit coupled to said lower end of said steering wheel shaft and provided with an output shaft, and a steering linkage connected to said output shaft of said steering gear unit, said lamp assembly including a front lamp device mounted turnably on said automobile body, a motor drive device coupled to said front lamp device and operable so as to turn said front lamp device relative to said automobile body, and a control device coupled electrically to said motor drive device and coupled mechanically to said wheel drive assembly for detecting angular rotation of said steering wheel and for operating said motor drive device so as to turn said front lamp device by an angle corresponding to the angular rotation of said steering wheel, wherein said control device comprises:

an angle control unit for detecting the angular rotation of said steering wheel, said angle control unit generating a corresponding electrical control signal for controlling said motor drive device to turn said front lamp device relative to said automobile body; and a coupling unit which couples said wheel drive assembly and said angle control unit so as to transmit the rotation of said steering wheel to said angle control unit;

said output shaft of said steering gear unit being provided with a gear which meshes with said coupling unit.

* * * * *